(12) United States Patent
Chen

(10) Patent No.: US 8,594,244 B2
(45) Date of Patent: Nov. 26, 2013

(54) DATA SIGNAL PHASE REVERSAL CORRECTION METHOD AND SYSTEM IMPLEMENTING THE SAME

(75) Inventor: Kun-tso Chen, Fang-Yuan Hsiang (TW)

(73) Assignee: MEDIATEK Inc., Hsin-Chu (TW)

( * ) Notice: Subject to any disclaimer, the term of this patent is extended or adjusted under 35 U.S.C. 154(b) by 1009 days.

(21) Appl. No.: 12/419,047

(22) Filed: Apr. 6, 2009

(65) Prior Publication Data
US 2010/0254492 A1    Oct. 7, 2010

(51) Int. Cl.
*H03H 7/30* (2006.01)

(52) U.S. Cl.
USPC .................. 375/329; 375/362; 375/364

(58) Field of Classification Search
USPC .................. 375/329, 362, 364, 379, 308
See application file for complete search history.

(56) References Cited

U.S. PATENT DOCUMENTS

| | | | |
|---|---|---|---|
| 3,736,507 A * | 5/1973 | Wolejsza et al. | 375/281 |
| 4,232,313 A * | 11/1980 | Fleishman | 342/36 |
| 4,301,534 A | 11/1981 | Genter | |
| 4,357,626 A * | 11/1982 | Romeas | 386/204 |
| 4,539,684 A | 9/1985 | Kloker | |
| 5,229,997 A | 7/1993 | Hirata et al. | |
| 5,311,554 A | 5/1994 | Morera et al. | |
| 5,422,916 A | 6/1995 | Nall | |
| 5,463,627 A | 10/1995 | Matsuoka et al. | |
| 5,539,783 A | 7/1996 | Papson | |
| 5,555,247 A | 9/1996 | Matsuoka et al. | |
| 5,592,518 A | 1/1997 | Davis et al. | |
| 5,619,269 A | 4/1997 | Lee et al. | |
| 5,844,907 A | 12/1998 | Uchiki et al. | |
| 5,949,834 A | 9/1999 | Laud et al. | |
| 6,052,423 A | 4/2000 | Blois et al. | |
| 6,069,928 A | 5/2000 | Gupta | |
| 6,072,839 A | 6/2000 | Mondal et al. | |
| 6,081,570 A | 6/2000 | Ghuman et al. | |
| 6,278,699 B1 | 8/2001 | Atarius | |
| 6,330,251 B1 | 12/2001 | O'Loughlin et al. | |
| 6,389,088 B1 | 5/2002 | Blois et al. | |
| 6,396,411 B1 | 5/2002 | Bell et al. | |
| 6,480,559 B1 | 11/2002 | Dabak | |
| 6,505,220 B1 | 1/2003 | Ikeda | |
| 6,539,047 B1 | 3/2003 | Moon | |
| 6,603,735 B1 | 8/2003 | Park et al. | |
| 6,625,239 B1 | 9/2003 | Shiraishi et al. | |
| 6,631,143 B1 | 10/2003 | Karim | |
| 6,731,624 B1 | 5/2004 | Maekawa et al. | |
| 6,741,578 B1 | 5/2004 | Moon et al. | |
| 6,778,317 B1 * | 8/2004 | Hurrell et al. | 359/325 |
| 6,788,732 B2 | 9/2004 | Moon | |

(Continued)

FOREIGN PATENT DOCUMENTS

| | | |
|---|---|---|
| CN | 1219806 | 6/1999 |
| CN | 1802572 | 7/2006 |

*Primary Examiner* — Qutbuddin Ghulamali
(74) *Attorney, Agent, or Firm* — Kirton McConkie; Evan R. Witt

(57) ABSTRACT

A data signal phase reversal correction method and system implementing the same are disclosed. In the present invention, a pilot signal of a satellite is checked to see if there is a phase reversal according to an accumulation of correction results of symbols of the received pilot signal with corresponding symbols of a known pilot sequence. It is determined whether a phase correction of a data signal of the satellite is to be executed or not by referencing the phase reversal determination result of the pilot signal.

21 Claims, 11 Drawing Sheets

(56) References Cited

U.S. PATENT DOCUMENTS

| | | |
|---|---|---|
| 6,873,647 B1 | 3/2005 | Tiedemann, Jr. et al. |
| 6,891,881 B2 | 5/2005 | Trachewsky et al. |
| 6,993,101 B2 | 1/2006 | Trachewsky et al. |
| 7,006,588 B2 | 2/2006 | Simmons et al. |
| 7,006,840 B2 | 2/2006 | Bultan et al. |
| 7,038,733 B2 | 5/2006 | Dent |
| 7,099,421 B2 | 8/2006 | Simmons et al. |
| 7,130,333 B2 | 10/2006 | Gibson, Jr. et al. |
| 7,231,583 B2 | 6/2007 | Febvre et al. |
| 7,423,984 B2 * | 9/2008 | Hasegawa et al. ............ 370/282 |
| 7,693,245 B2 * | 4/2010 | Thesling et al. ............... 375/362 |
| 7,885,317 B2 * | 2/2011 | Fenton .......................... 375/147 |
| 2004/0190600 A1 * | 9/2004 | Odenwalder ................. 375/147 |
| 2006/0083293 A1 * | 4/2006 | Keegan et al. ................ 375/148 |
| 2007/0147567 A1 * | 6/2007 | Thesling et al. .............. 375/355 |

* cited by examiner

DATA SIGNAL PHASE REVERSAL CORRECTION METHOD AND SYSTEM IMPLEMENTING THE SAME

TECHNICAL FIELD OF THE INVENTION

The present invention relates to PSK (Phase Shift Keying) modulated navigation data processing in GNSS (Global Navigation Satellite System), more particularly, to a method for correcting a phase reversal of a data signal of PSK modulated navigation data, and a receiver implementing such a method.

BACKGROUND OF THE INVENTION

For PSK (Phase Shift Keying) communication system, the carrier phase is modulated by the transmitted data. Taking BPSK (Binary PSK) for example, the carrier phase is reversed (added 180 degrees) when a data symbol 0 is transmitted. On the other hand, the carrier phase is not changed when a data symbol 1 is transmitted. In general, the carrier phase is changed according to the transmitted data symbol. For a MPSK (Multiple PSK) modulation, where M is equal to 2 (BPSK), 4(QPSK) and so on, the carrier phase will stay in one of the M states:

$$0, \frac{360}{M}, \frac{360 \times 2}{M}, \ldots, \frac{360 \times (M-1)}{M}$$

degrees, when a data symbol is transmitted. The received carrier phase is also changed due to the user motion, clock drift and so on. Therefore, the receiver must run a synchronization process to track the carrier phase before it can detect the transmitted data symbol. In the synchronization process, the receiver must eliminate the effect of the phase change due to the data symbol or bit transition. For example, a squaring method or Costas PLL (Phase Lock Loop) in a BPSK carrier tracking loop is usually used to track the carrier phase which removes the data bit transition in its phase error discriminator. When the carrier tracking loop of an MPSK receiver achieves its steady state (i.e. locking the signal), there exists a phase ambiguity. That is, it can track the carrier phase but with a possible error of $$\frac{360}{M}, \frac{360 \times 2}{M}, \ldots, \frac{360 \times (M-1)}{M}$$

degrees.

Taking BPSK PLL for example, the tracked carrier phase might be exact or has a phase reversal existing with an error of 180 degrees. After the PLL is locked, the transmitted data bit can be determined by detecting the phase transition. Then, the stream of transmitted data bits or symbols is checked to correct the phase ambiguity of PLL. In general, a preamble per data frame is used to synchronize the data frame boundary and correct the data symbol phase due to the phase synchronization ambiguity. The preamble is a fixed and known pattern of data symbols so that the receiver can check the received data phase by comparing the received preamble with the defined preamble. If a cycle slip occurs during the PLL operation, there might be a phase ambiguity error after the PLL locks the signal again. Then, we must use the content of the transmitted data to correct the phase ambiguity. Note that a transmitted data frame is corrupted when a phase ambiguity error (phase reversal in BPSK) occurs during its transmission. Therefore, the defined preamble pattern can always be used to correct the phase reversal error. However, the preamble appears once every data frame. Therefore, it can not correct the data phase reversal when the signal strength is so weak that the preamble length is not enough to detect the phase reversal. Moreover, a data frame is corrupted when a phase reversal occurs during its transmission. The following data frame is restored by checking the preamble. This means that it is often not possible to quickly correct the phase reversal error by using the preamble and therefore results in corrupted frames. Therefore, it will be highly desired if a technique for improving phase reversal correction speed can be provided.

In GNSS, the navigation data message is usually transmitted by BPSK or DPSK (Differential PSK) modulation. For GPS (Global Positioning System) where BPSK is used to transmit the navigation data message, one data frame consists of 10 words. One word is 30 bits and protected by a parity check code. Each data bit is 20 ms. The BPSK phase ambiguity is resolved in the parity check algorithm. Meanwhile, there is a preamble (a fixed bit pattern) in the first word (TLM word) of a frame. This preamble can be used to synchronize the data frame boundary and can also be used to correct the BPSK phase reversal. In order to successfully receive a word without corruption, there cannot be any phase reversal during the transmission of the data word, which is 600 ms. The SBAS (Satellite Based Augmentation System) also uses BPSK. A SBAS data frame consists of 500 symbols with each symbol of 2 ms. The data frame is protected by convolutional encoding and a preamble per frame is also used to correct the BPSK phase reversal. Accordingly, it is required that there is no phase reversal during the transmission of a data frame, which is 1 second. For Galileo E1B signal, a BPSK data frame consists of 250 symbols with each symbol being 4 ms. There is a preamble pattern per frame to correct the phase reversal. Therefore, the data phase is required to be stable during 1 second. As can be seen, using the preamble to correct the phase reversal error requires that there is no phase reversal error in one data frame which has a long time in GNSS signal. This might be a problem for high dynamic and weak signal. Therefore, we might need another technique to correct phase reversal error.

A GNSS receiver must measure the ranges to satellites to determine its position. The range between a receiver and a satellite is called PR (Pseudo-Range) and is measured by detecting the TOA (time of arrival) of the signal transmitted by the satellite. The broadcast satellite navigation data message carries the system time (TOW, time of week), which is required to determine the TOA. Moreover, it is required in the computation of satellite's position. Therefore, the data must be collected correctly so that the receiver can determine the user's position, velocity and system time (PVT). However, the carrier frequency and phase must be tracked stably before the receiver can detect the data bit, which modulates the carrier phase. If a PLL is used, both the frequency and phase of the carrier are locked. The receiver can detect the BPSK data bit by checking the locked carrier phase. On the other hand, only the carrier frequency is locked in a FLL and we must use DD (differential detection) technique to detect the data bit. That is, a different data bit from the last data bit is transmitted if there is a carrier phase transition. Note that there are possibly phase reversal errors in both PLL and FLL based data detection. In theory, the data detection performance, such as bit error rate, of PLL is better than FLL. However, the PLL tracking robustness is weaker than FLL. For example, FLL can lock the carrier for weaker signals and higher user dynamics. Therefore, it is preferred to use FLL and DD technique to detect the BPSK data so that the receiver can work well for weaker signals and higher dynamics.

As mentioned above, we can use DD technique in a FLL to detect the BPSK data bit. The DD method is to check if there is a phase transition between two adjacent carrier phases as estimated by the FLL. A current data symbol is determined based on the phase transition and the previous symbol phase. However, a DD error will propagate and cause phase reversal errors of all the following received symbols. This is equivalent to a burst error of data symbols. For example, if one DD error occurs in the detection of the third SBAS data symbol in a frame, all the phases of the following 247 data symbol in the same frame are reversed. In general, it is difficult to resolve a long burst error by using an error detection or correction code, such as a convolutional code used in the SBAS frame. A minor DD error rate results in a severe frame (or bit) error rate especially for a data frame which consists of many data bits, such as a SBAS data frame. Therefore, the FLL and DD method might be good for GPS but not suitable for SBAS and Galileo since the latter two systems require the carrier phase to be stable in a long period of data frame, which is 1 second. Therefore, the FLL is preferred for its robustness but it is desirable to provide a technique to correct the burst error of data symbol due to the DD error of FLL.

As discussed, there is phase ambiguity issue in both PLL and FLL and the receiver can check the preamble (or a sync word) to correct it. That is, the phase reversal can be corrected by checking a known sequence of a frame, for example, a SW (sync word) in the header of a frame. FIG. 1 schematically shows how a phase reversal corrupts a frame and the timing of phase correction in prior art. As shown, there is a phase reversal occurring during the first frame in the drawing. Therefore, this frame is a bad frame and must be discarded since the receiver fails to know when the phase reversal occurs in this frame. The receiver cannot get aware of the occurrence of the phase reversal until the SW of the next frame is received and checked. To check the SW of 40 ms (i.e. 10 symbols) in Galileo E1B, for example, a total correlation value (i.e. accumulation of correlation results of the received SW symbols with corresponding symbols of a known SW sequence), which is referred to as metricSW herein, of the received SW and the known SW sequence is calculated as follows:

$$metricSW = \sum_{i=0}^{9} SW(i) \cdot symB(i) \quad (1)$$

where SW(i) is a symbol of the received SW, and symB(i) is a corresponding symbol of the known SW sequence.

If there is no phase reversal, the value of metricSW in the case of Galileo E1B should be 10 in the best situation when hard decision of symB(i) is used, i.e., symB(i)=1 or −1. If CNR (carrier-to-noise ratio) is low, the metricSW value may be less than 10 because some errors of symB occur. If there has been a phase reversal before the SW is received, then the metricSW value should be negative. FIG. 2 is a diagram showing a relationship between the metricSW value and CNR. As can be seen from this drawing, when CNR is low, a false alarm of phase reversal correction is easy to happen. That is, the receiver cannot determine the phase reversal correction when the CNR is weak.

As discussed above, it will be highly desirable if a technique for improving phase reversal correction sensitivity and speed can be provided.

SUMMARY OF THE INVENTION

In accordance with the present invention, a data signal phase reversal correction comprises receiving a pilot and a data signal from a signal source; processing the pilot signal and the data signal; determining if there is a phase reversal occurring during processing the pilot signal; and correcting a phase of the data signal when a phase reversal occurs in the pilot signal. The data signal and the pilot signal have a fixed phase relationship. The phase reversal determination is done by computing an accumulation of correlation values obtained by correlating a predetermined number of symbols of the received pilot signal with corresponding symbols of a known pilot symbol sequence of the satellite and deciding whether there is a phase reversal based on the accumulation.

The present invention also provides a data signal phase reversal correction system. The system comprises a receiving module for receiving a pilot signal and a data signal from a signal source; a processing module for processing the pilot signal and the data signal; and a phase reversal detecting device for checking the pilot signal to determine if there is a phase reversal occurring in the pilot signal according a processing result for the pilot signal.

In one embodiment, the phase reversal detecting device corrects a phase of the data signal when a phase reversal occurs in the pilot signal. The processing module of the system further comprises a Doppler remover for wipe off Doppler frequency components of the data and pilot signals and a navigation processor for further signal processing. In other embodiments, the Doppler remover corrects a phase of the data signal when a phase reversal occurs in the pilot signal. Alternatively, the phase of the data signal is corrected in the navigation processor, which is implemented by a digital signal processor (DSP).

BRIEF DESCRIPTION OF THE DRAWINGS

The present invention will be described in detail in conjunction with the appending drawings, in which.

DETAILED DESCRIPTION OF THE INVENTION

For a Global Navigation Satellite System (GNSS) in which each satellite transmits a data signal and a pilot signal, the relationship between carrier phases of the data signal and the pilot signal is fixed. For example, the data and pilot signals are in-phase or quadrature in timing. The data signal consists of a stream of data frames. The pilot signal is modulated by a known periodic secondary code sequence or dataless. For a receiver, synchronization of data and pilot signals must be done before the data and pilot signals can be used to decode the transmitted data and used to enhance the tracking loop sensitivity, respectively. The data and pilot signals have different signal formats but the timing relationship between them is fixed. Therefore for BPSK modulated data and pilot signals, when the data signal has a phase reversal, it is reasonable to deduce that the pilot signal also has a phase reversal at the same time. That is, a common BPSK phase reversal occurs for both the data and pilot signals.

Figure 1:
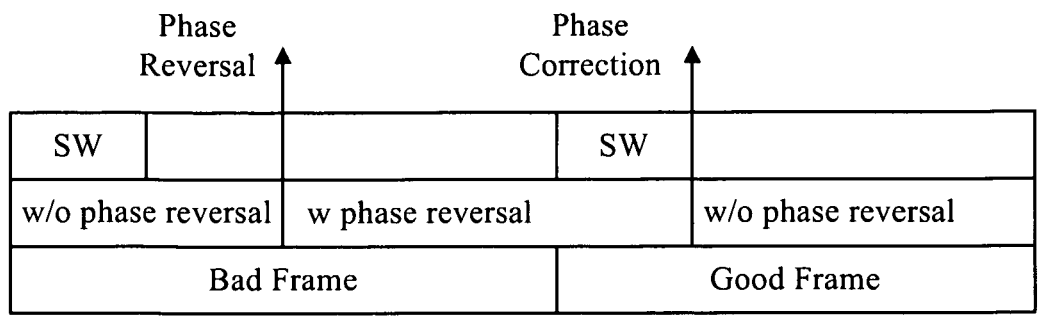
FIG. 1 is a schematic illustration showing how a phase reversal corrupts a frame and the timing of phase correction in prior art.
Figure 2:
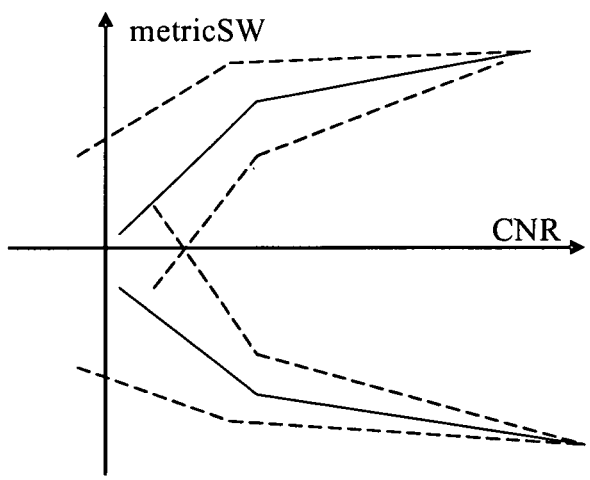
FIG. 2 is a diagram showing a relationship between a metricSW value and CNR.
Figure 3:
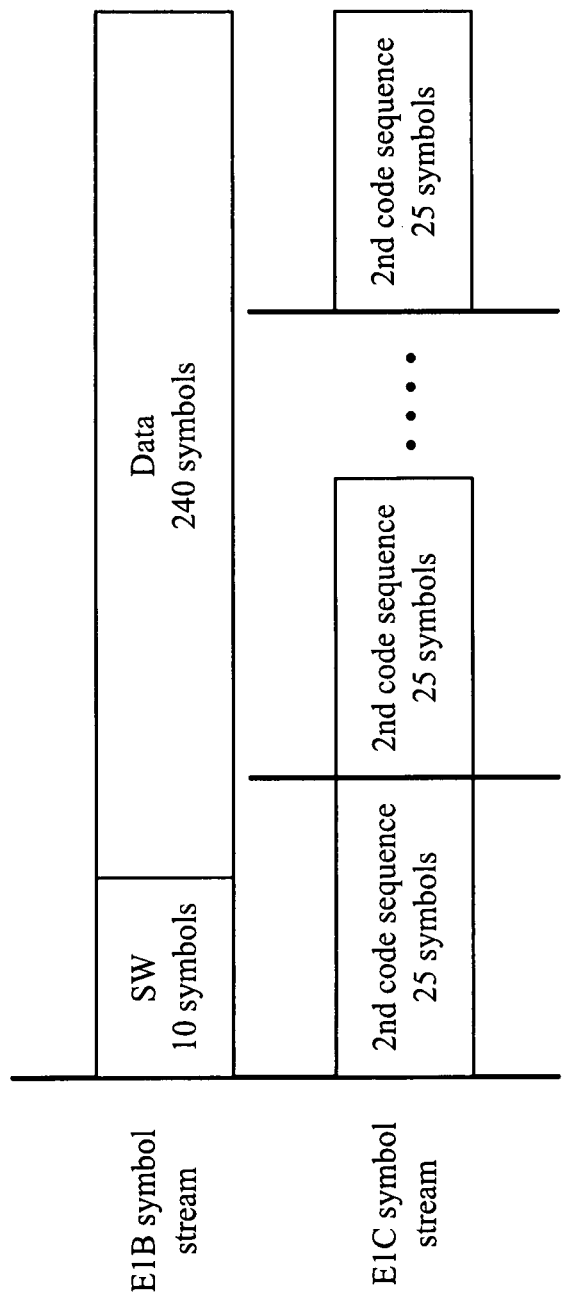
FIG. 3 shows data structures of the data signal and pilot signal of Galileo E1 which is one kind of GNSS.

FIG. 3 shows data structures of the data signal and pilot signal of Galileo E1 which is one kind of GNSS. In Galileo E1, each satellite transmits the data signal E1B and the pilot signal E1C. The upper portion of this drawing shows a symbol stream of the data signal E1B, while the lower portion shows a symbol stream of the pilot signal E1C. The data signal E1B is transmitted by frames, and the pilot signal E1C is transmitted as repeated secondary code sequences. Each frame of the data signal E1B contains 120 data bits, and the data bits are encoded by a convolution coding scheme into 240 data symbols. Additional sync word (SW) of 10 data symbols are added to the header of each frame. Thus the frame consists of 250 symbols per second. The symbol period is 4 ms. The pilot signal is modulated by a periodic secondary code sequence. Each sequence contains 25 symbols. Then the secondary code period is 4×25=100 ms.

As shown, each frame of the data signal E1B contains a SW of 10 symbols and a payload data area of 240 symbols. The payload data area carries unknown navigation data messages. During the frame period of 1 second, the pilot signal E1C has the secondary code sequence of 25 symbols repeated 10 times.

Figure 4:
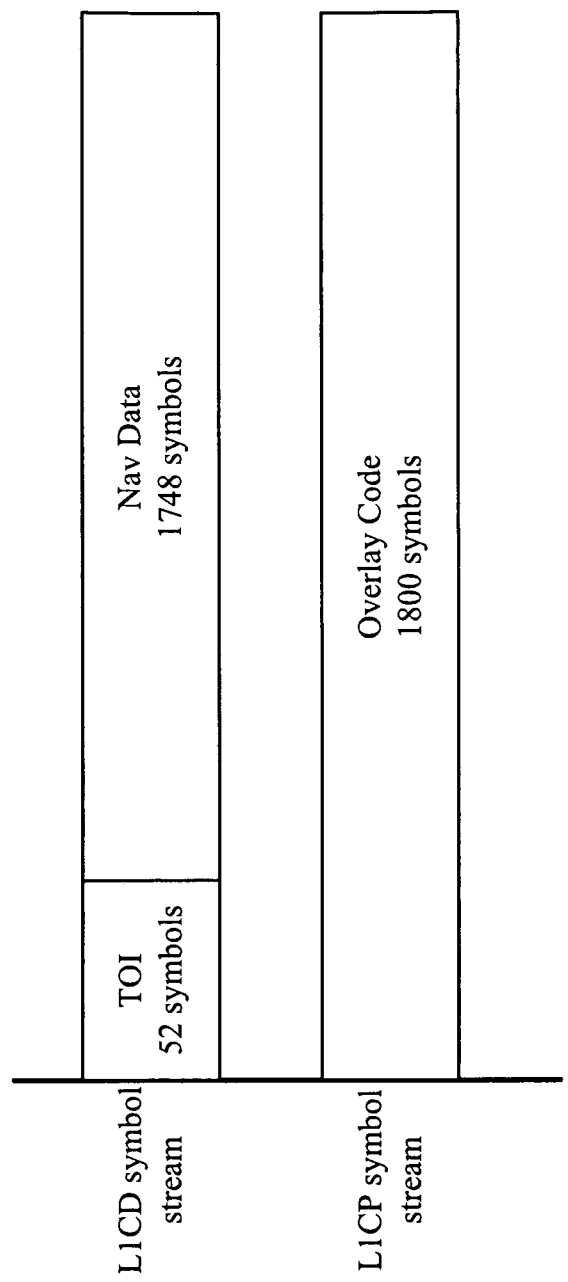
FIG. 4 shows data structures of the data signal and pilot signal of GPS L1C which is another kind of GNSS.

FIG. 4 shows data structures of the data signal and pilot signal of GPS L1C which is another kind of GNSS. The upper portion of this drawing shows a symbol stream of the data signal L1CD, while the lower portion shows a symbol stream of the pilot signal L1CP. Each frame of the data signal L1CD has 9 bits of "Time of Interval" (TOI) word. The 9-bit TOI is encoded into 52 symbols using Bose, Chaudhuri, and Hocquenghem (BCH) coding. The TOI can be deemed as SW of Galileo E1. In addition to the TOI, each frame further contains navigation data of 1748 symbols. The symbol period is 10 ms. That is, the symbol timing for GPS L1C is 100 symbols per second. The pilot signal L1CP uses the same symbol timing. L1CP is encoded with a secondary code sequence, which is referred to as an "overlay code", of 1800 symbols. For each L1CD frame, the code sequence of the pilot signal L1CP appears once. The frame sync for L1CD means that the start symbol of the TOI is found, and the pilot sync for L1CP means that the start symbol of the secondary code sequence is found. As can be seen, the leading edge of L1CD TOI is aligned with the leading edge of the L1CP overlay code.

Figure 5:
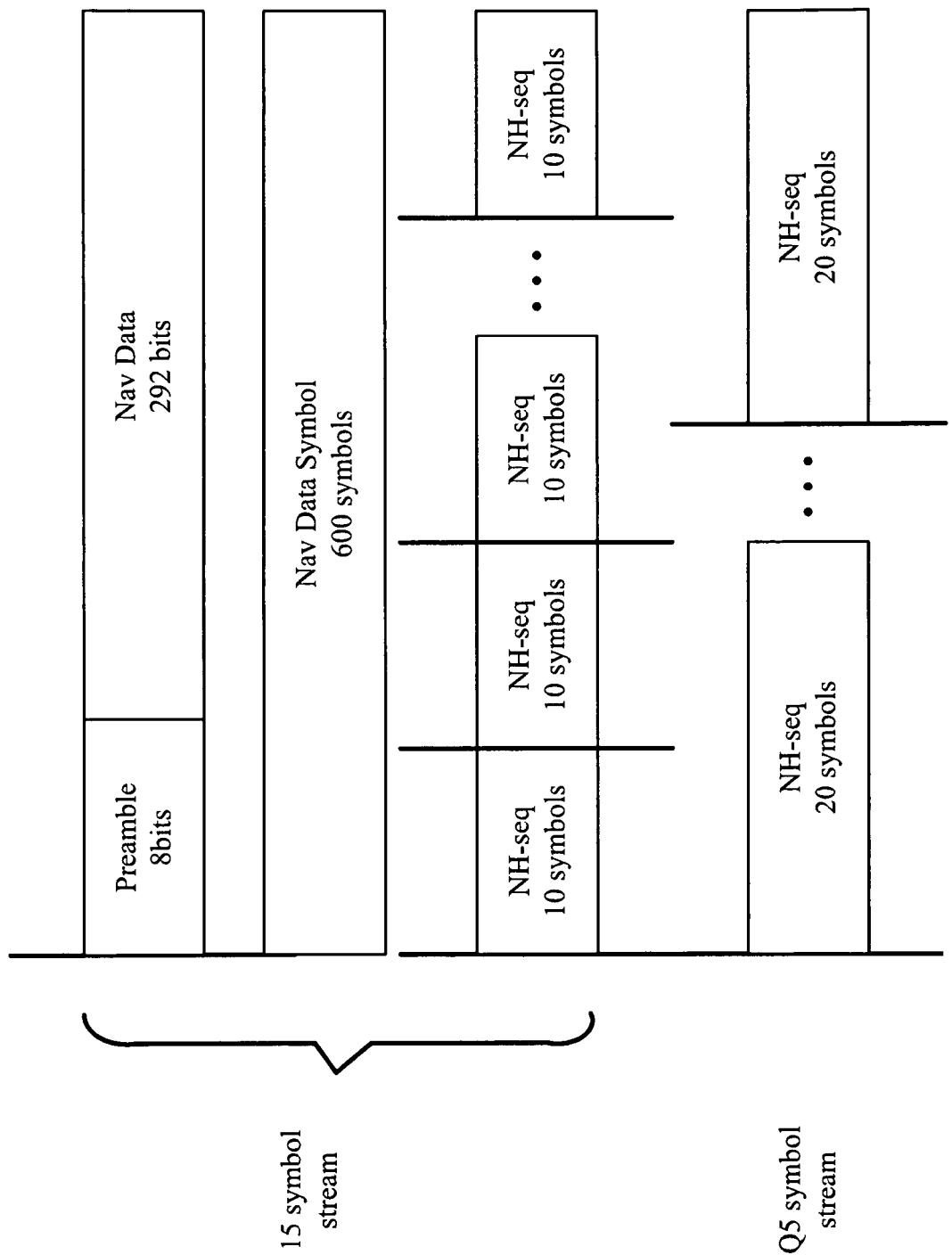
FIG. 5 shows data structures of the data signal and pilot signal of GPS L5 which is another kind of GNSS.

FIG. 5 shows data structures of the data signal and pilot signal of GPS L5 which is another kind of GNSS. The upper three rows of this drawing show a symbol stream of the data signal I5, while the lowest row shows a symbol stream of the pilot signal Q5. Each I5 frame contains 8 bits of preamble and 292 bits of navigation data. The 300-bit frame is encoded with forward error correction (FEC) coding into 600 data symbols. Then each data symbol (the data symbol period is 10 ms) is modulated by a Neumann Hoffman (NH) sequence, and each sequence has 10 code symbols (the code symbol period is 1 ms). The symbol timing is 1000 symbols per second. The pilot signal Q5 has a 20-symbol secondary NH-sequence repeated with the same symbol timing of 1000 symbols per second. To carry out the I5 frame sync, a start bit of the preamble, which is equivalent to the SW of Galileo E1, should be found. To find the start bit of the preamble, I5 data symbol sync must be achieved first. To carry out Q5 pilot sync, a start symbol of the secondary code sequence (i.e. the 20-symbol NH sequence) must be found. Although the intermediate conversion of the I5 frame is complicated, the start bit of the preamble is indirectly aligned with the start symbol of one of the Q5 secondary code sequences.

Figure 6:
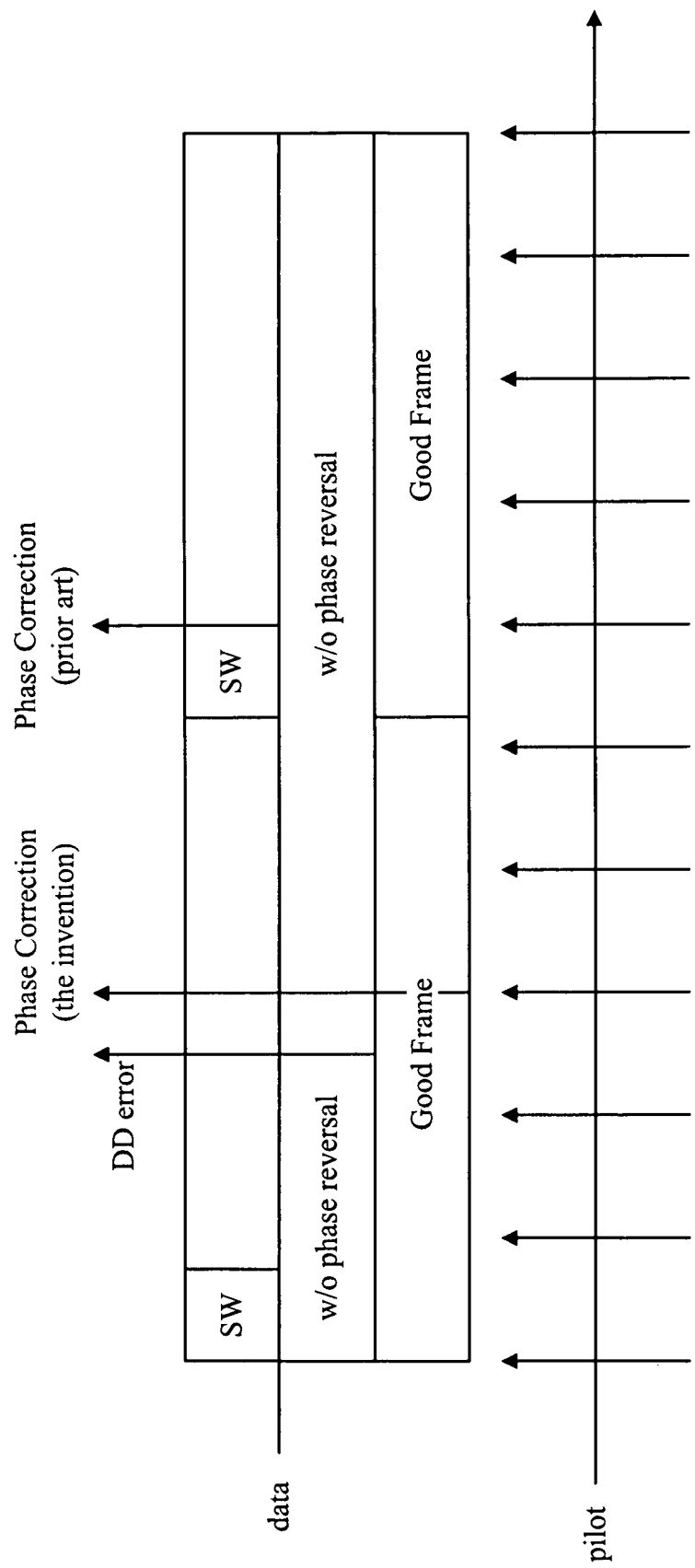
FIG. 6 is a schematic illustration generally showing a comparison between the conventional art and one of the embodiments.

Taking Galileo E1C as an example, FIG. 6 is a schematic diagram generally showing a concept of the embodiments. As shown, a phase reversal (or a DD error, which will cause a burst error) occurs in the first frame of this drawing. Each arrowed line at the pilot signal indicates a phase reversal check. By checking the pilot signal frequently, the phase reversal (or DD error) can be found and corrected much earlier than prior art. In prior art, the phase reversal (or DD error) can only be found and corrected until the SW of the next frame has been checked. It is noted that, the length of the burst error is reduced after correction of the phase reversal error. Therefore, the error correction technique such as an interleaver and deinterleaver used in Galileo E1B/C signal can be used to correct this short burst error.

Figure 7:
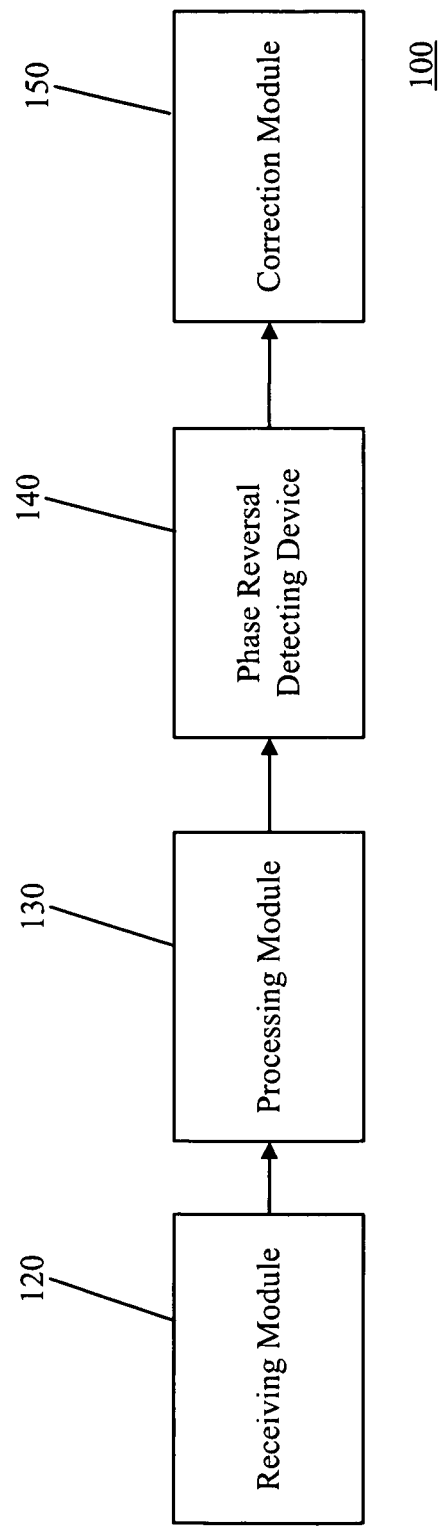
FIG. 7 is a block diagram generally showing a data signal phase reversal correction system in accordance with one embodiment.

FIG. 7 is a block diagram generally showing a data signal phase reversal correction system 100 in accordance with one of the embodiments. The system comprises the following elements. A receiving module 120 is used for receiving a data signal and a pilot signal from a signal source (not shown), such as a satellite. A processing module 130 is used for processing the data signal and pilot signal. A phase reversal detecting device 140 is used for detecting whether there is a phase error (e.g. phase reversal) occurring in the pilot signal according to the processing result of the pilot signal. If there is a phase reversal in the pilot signal, it is deduced that the data signal also has a phase reversal. And a correction module 150 is in charge of correcting the phase reversal of the data signal.

In the system 100, the receiving module 120 conducts the RF (radio frequency) processing for the signals and outputs baseband data and pilot signals. The processing module 130 conducts Doppler removal, code correlation, frame synchronization, pilot synchronization and the like to the baseband data and pilot signals. The phase reversal detecting device 140 uses some processing results to determine the existence of the phase reversal and can be implemented as hardware or software in a digital signal processor. The correction module 150 can be implemented also in the digital signal processor or a Doppler remover in the processing module 130. In practice, it is possible that the correction module 150 is incorporated into the phase reversal detecting device 140.

Figure 8:
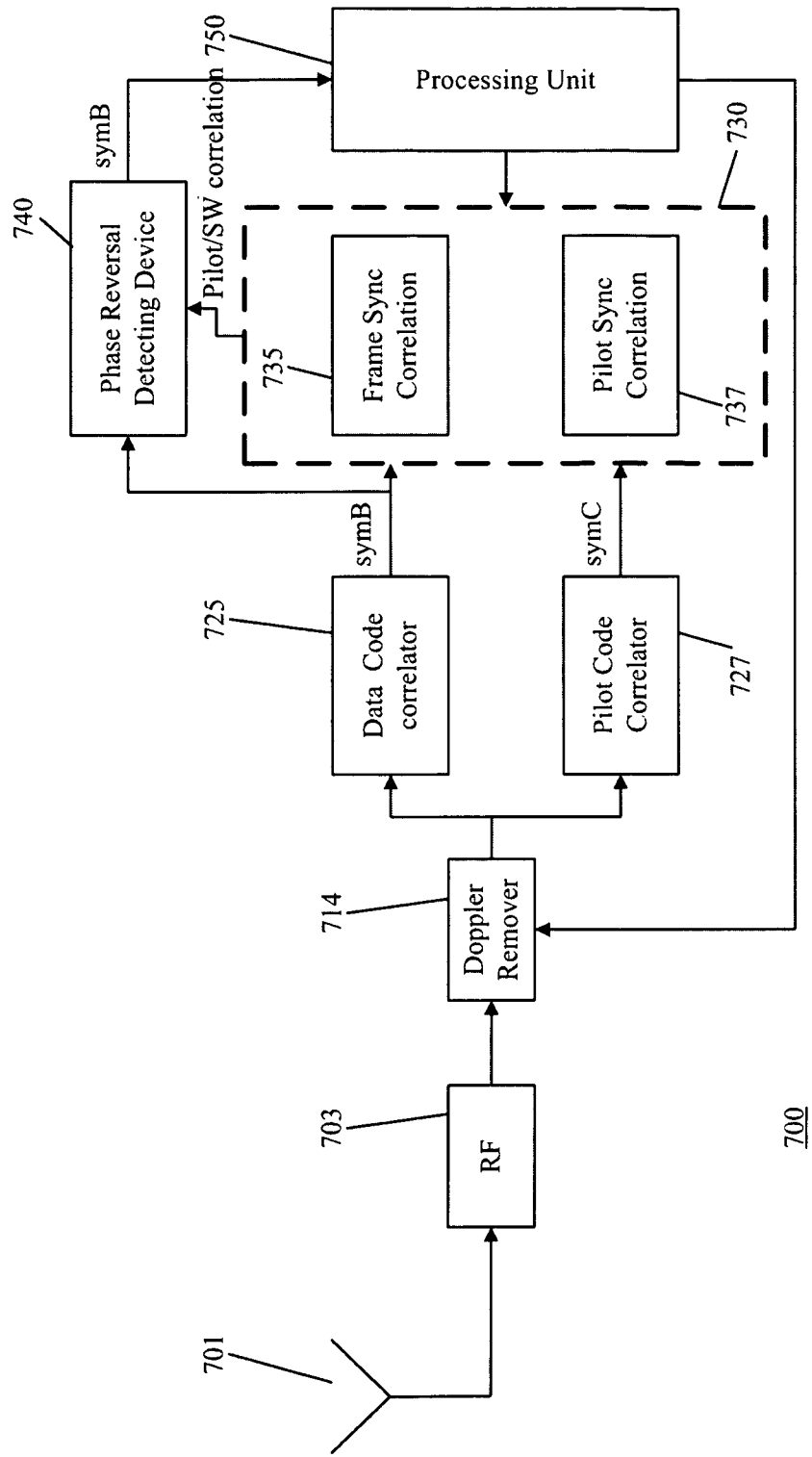
FIG. 8 is a block diagram showing a GNSS receiver implementing the data signal phase reversal correction system in accordance with another embodiment.

FIG. 8 is a block diagram showing a GNSS receiver 700 implementing the data signal phase reversal correction system in accordance with one embodiment. The receiver includes an antenna 701 for receiving satellite signals. The satellite signals from each satellite include a data signal and a pilot signal. An RF front end 703 is used to perform RF relevant operations such as down conversion and so on as widely known in this field. The antenna 701 and the RF front end 703, alternatively, the sole RF front end 703 can be deemed to be included in the receiving module 120 of the system 100 in FIG. 7. A Doppler remover 714 is used to wipe off Doppler frequency components of the signals. As commonly known, the Doppler remover 714 contains a carrier NCO (numerically controlled oscillator; not shown), phase shifters (not shown) and mixers (not shown). The Doppler removed data and pilot signals are then passed to the successive portions. It is noted that the Doppler remover 714 may also track the carrier phase. The receiver 700 has a data code correlator 725 for correlating the data signal from the Doppler remover 714 with a ranging code for the data signal to output a data symbol stream and a pilot code correlator 727 for correlating the pilot signal from the Doppler remover 714 with a ranging code for the pilot signal to output a pilot symbol stream. Taking Galileo E1 as an example, the data code correlator 725 outputs a data symbol stream symB of the data signal E1B, and the pilot code correlator 727 outputs a pilot symbol stream symC of the pilot signal E1C. It is possible to implement the data code correlator 725 and the pilot code correlator 727 by a single correlator with a time multiplexing manner.

The receiver 700 has a sync detection device 730, which can be referred to U.S. patent application Ser. No. 12/138,644, entitled "SYNC DETECTION DEVICE AND METHOD FOR GNSS", filed on Jun. 13, 2008, by the inventor of the present invention. The sync detection device 730 includes a frame sync correlation unit 735 for correlating the symbols of the data symbol stream symB with the possible hypotheses to output the correlation results thereof. For Galileo E1B, there are 250 hypotheses to be correlated as mentioned above if there is no other aiding information to reduce the correlation range. A pilot sync correlation unit 737 is used to correlate the symbols of the pilot symbol stream symC with the possible hypotheses of a known sequence of the pilot signal (hereinafter also referred to as a known pilot sequence) to output the correlation results thereof. The sync detection device 730 further comprises a sync decision unit (not shown), which receives the correlation results from the frame sync correlation unit 735 and pilot sync correlation unit 737 to carry out frame sync and pilot sync. This portion is not the issue to be discussed in the present invention, and therefore is omitted herein. The details can be referred to the application mentioned above. The Doppler 714, data code correlator 725, pilot code correlator 727 and the sync detection device 730 can be deemed to be included in the processing module 130 in FIG. 7.

The receiver 700 has a phase reversal detecting device 740, which implements the phase reversal detecting device 140 of FIG. 7. The phase reversal detecting device 740 receives correlation results of the received pilot signal with the known pilot sequence, and periodically integrates and dumps the correlation results to check if there is a phase reversal occurs. If it is found that a phase reversal has occurred in the pilot signal at a time point, it can be deduced that the data signal also has a phase reversal at that time point. When it is determined that there is a phase reversal, the phase reversal detecting device 740 reverses the phase of the data symbol stream to correct the phase reversal. In another case, the phase reversal detecting device 740 also receives the correlation results of the SW of the received data signal with a corresponding known SW sequence to double check the existence of the phase reversal. The details will be further described later. After the phase reversal is corrected, the data symbol stream symB is passed to a navigation processor 750 for further signal processing, which is not the issue to be discussed in the present invention. The navigation processor 750, which is implemented by a digital signal processor (DSP), for example, can be deemed to be included in the processing module 130 of FIG. 7.

Figure 9:
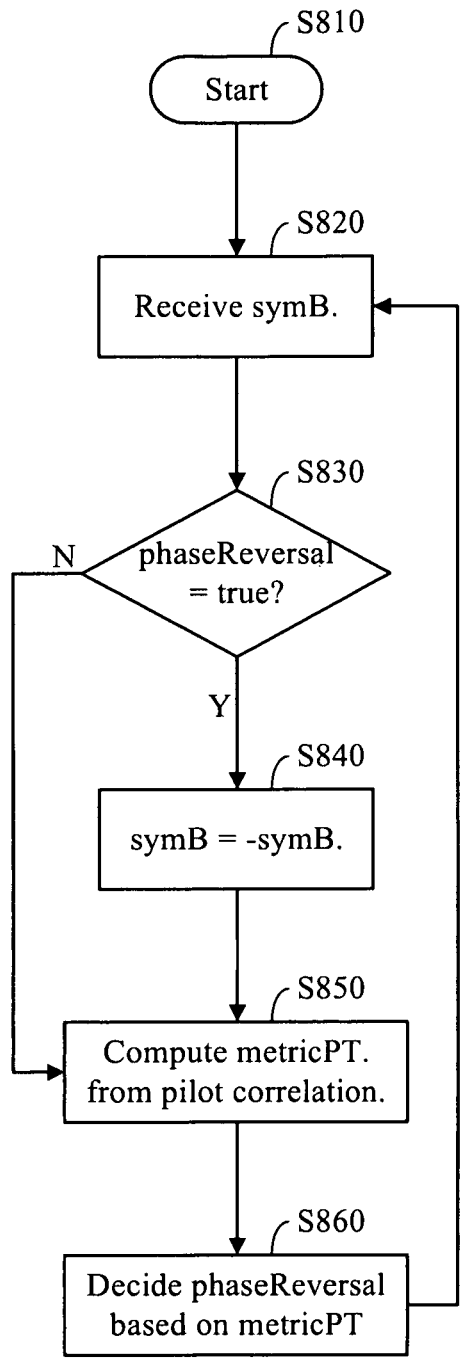
FIG. 9 is a flowchart showing a first embodiment of the data signal phase reversal correction method in accordance with the present invention.

FIG. 9 is a flowchart showing a first embodiment of the data signal phase reversal correction method in accordance with the present invention. This method is substantially executed in the phase reversal detecting device 740 of FIG. 8. The process of this method starts at step S810. In step S820, the phase reversal detecting device 740 receives the data symbol stream symB. In step S830, the phase reversal detecting device 740 checks a flag phaseReversal, which indicates whether there is a phase reversal. The flag is initially set as false. At this time, since the pilot symbol stream has not been checked yet, the flag phaseReversal is false. Under such a condition, the process goes to step S850. In step S850, the phase reversal detecting device 740 computes a metricPT value as follows:

$$metricPT = \sum_{i=0}^{N-1} NH(i) \cdot symC(i) \quad (2)$$

Where symC(i) is the pilot symbol stream of the received pilot signal, NH(i) is the corresponding symbols of a known sequence for the pilot signal (i.e. known pilot sequence), and metricPT is an accumulation of the correlation results of the received pilot symbol stream and the known pilot sequence. The phase reversal detecting device 740 may compute the metricPT value of N symbols for every m symbols, where N≤m. Since each correlation value of NH(i) and symC(i) has been calculated by the pilot sync unit 737 of the sync detection device 730, the phase reversal detecting device 740 may simply receive and accumulate the correlation values of NH(i) and symC(i) for i=0 to N-1 into the dump result metricPT for the N pilot symbols.

In step S860, the phase reversal detecting device 740 determines if there is a phase reversal occurring in the pilot symbol stream symC to decide the state of the flag phaseReversal based on the metricPT value. Then the process goes back to step S820. The steps S820 to S860 are recurred repeatedly. If it is decided that there is phase reversal in step S860, then the flag phaseReversal is set to be true. Accordingly, in step S830, the phase reversal detecting device 740 checks the flag and gets the result of "true". Under this condition, the phase reversal detecting device 740 reverses the phase of the data symbol stream (i.e. symB=−symB) to correct the phase reversal due to the phase reversal. This can be deemed as the correction module being incorporated into the phase reversal device as previously mentioned. In another embodiment, the estimated phase of the carrier tracking loop is reversed rather than the detected symB. As mentioned, the carrier phase can be tracked in the Doppler remover 714. In this case, the so called carrier tracking loop indicates the loop from the Doppler remover 714 to the navigation processor 750. In another case, the carrier tracking loop is implemented by programs in the DSP implementing the navigation processor 750. That is, the phase reversal can also be corrected in the Doppler remover 714 or the navigation processor 750.

Figure 10:
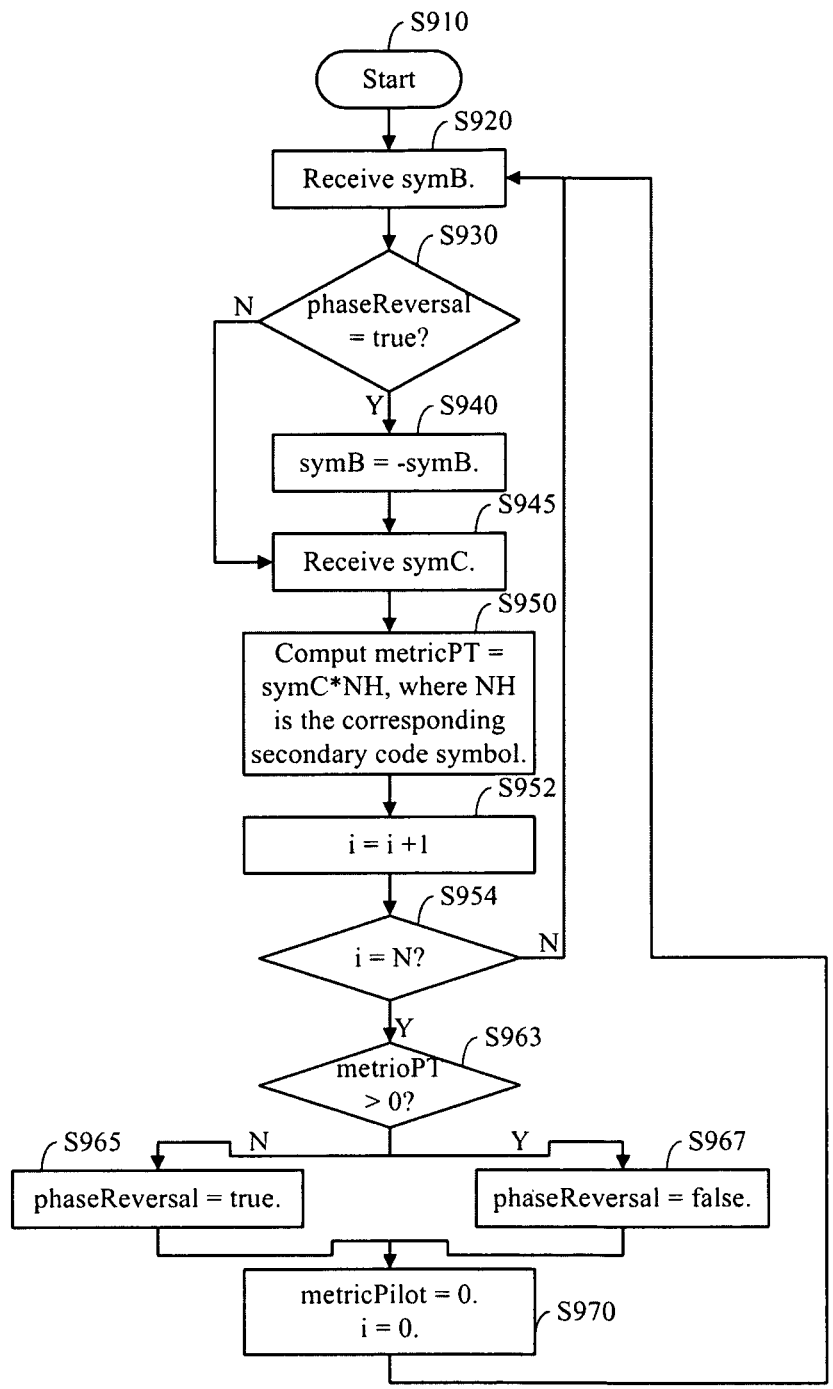
FIG. 10 is a flow chart further showing the process of FIG. 9 in detail.

FIG. 10 is a flow chart further showing the process of FIG. 9 in detail. In this flowchart, the sub-processes of phase correction and phase reversal determination are illustrated more particularly and definitely. The process starts at step S910. In step S920, the phase reversal detecting device 740 receives the data symbol stream symB. In step S930, the phase reversal detecting device 740 checks the phaseReversal flag. At this time, since the pilot symbol stream has not been checked yet, the flag phaseReversal is at the state "false". Under such a condition, the process goes to step S945. In step S945, the pilot symbol stream symC is received. In step S950, metricPT is computed by calculating and accumulating a correction result of the $i^{th}$ symbol symC(i) of the pilot symbol stream and the corresponding symbol NH(i) of the known pilot sequence (e.g. the corresponding second code symbol), where i=0 to N-1. In step S952, i is set as i=i+1. In step S954, it is checked if i has been reached N. If not, the process goes back to step S920. If i=N, it means that the metricPT of the current N pilot symbols have been computed, then the process goes to step S963 to decide if there is a phase reversal. In step S963, the phase reversal detecting device 740 determines if metricPT value is greater than zero. If the metricPT value is a negative value (i.e. metricPT<0), it means that there is a phase reversal, and the flag phaseReversal is set as true (step S965). If the metricPT value is a positive value (i.e. metricPT>0), it means that there is no phase reversal, and the flag phaseReversal is set as false. (step S967). No matter the flag is set to be true or false, the process goes to step S970. In step S970, the values of metricPT and i are both reset as zero, and the process goes back to step S920 for checking the next N pilot symbols.

Figure 11:
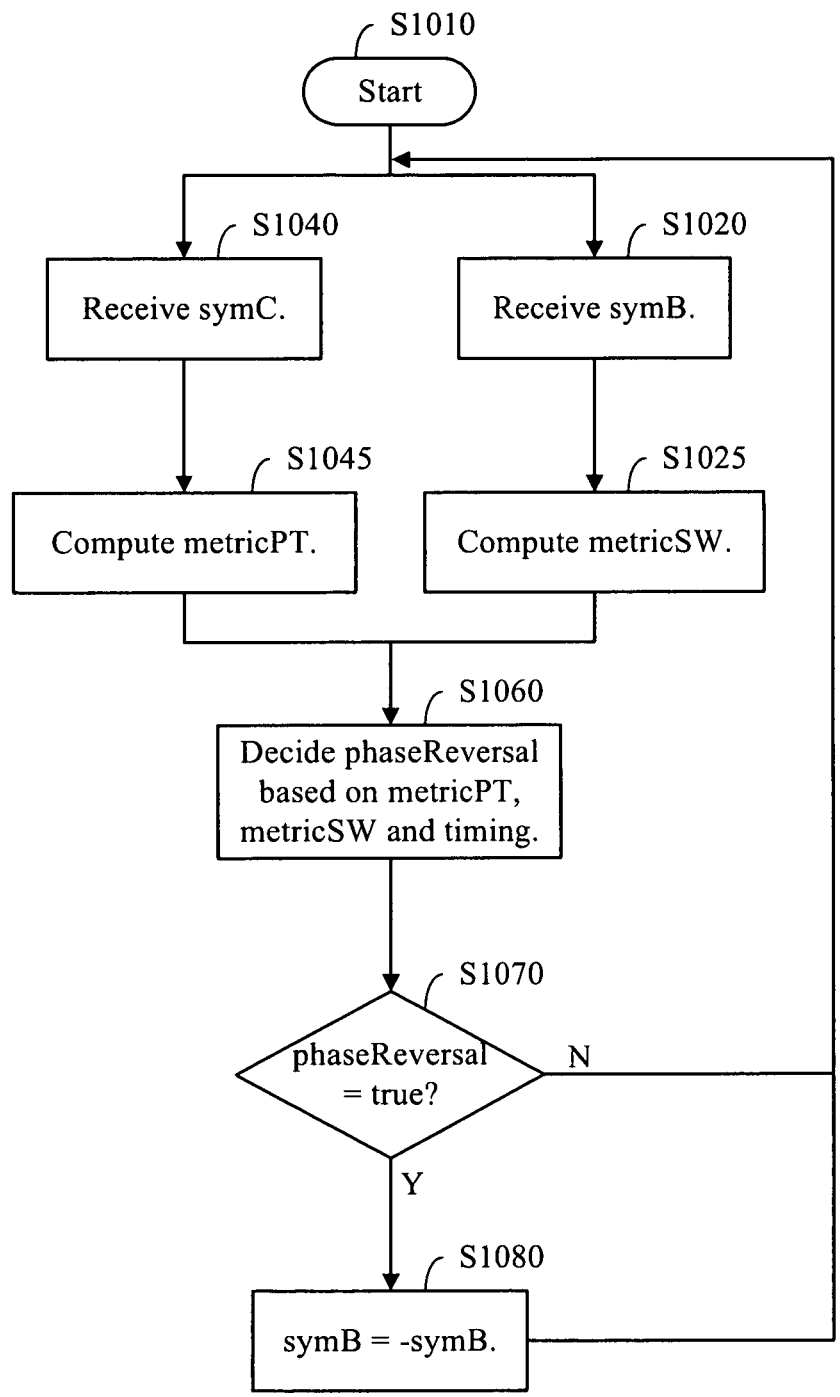
FIG. 11 is a flowchart showing a second embodiment of the data signal phase reversal correction method in accordance with the present invention.

FIG. 11 is a flowchart showing a second embodiment of the data signal phase reversal correction method in accordance with the present invention. The process starts at step S1010. In step S1020, the data symbol stream symB is received. In step S1025, metricSW is computed by using equation 1. In parallel, the pilot symbol stream symC is received in step S1040 and metricPT is computed by using equation 2. In step S1060, the phase reversal detecting device 740 decides the state of the flag phaseReversal (true or false) based on both metricSW and metricPT. Other timing information such as the time corresponding relationship between the computed metricPT and metricSW can also be brought into consideration. If there is a phase reversal, the flag phaseReversal is set as true; otherwise the flag phaseReversal is set as false. In step S1070, the flag phaseReversal is checked. If the flag is false, the process goes back to step S1020. If the flag is true, it means that there is a phase reversal, then the phase reversal detecting device 740 inverts the phase of the data symbol stream, that is, symB=−symB. In the present embodiment, in addition to checking the pilot symbol stream symC, the data symbol stream is also checked to assist determination for the existence of the phase reversal.

Figure 12:
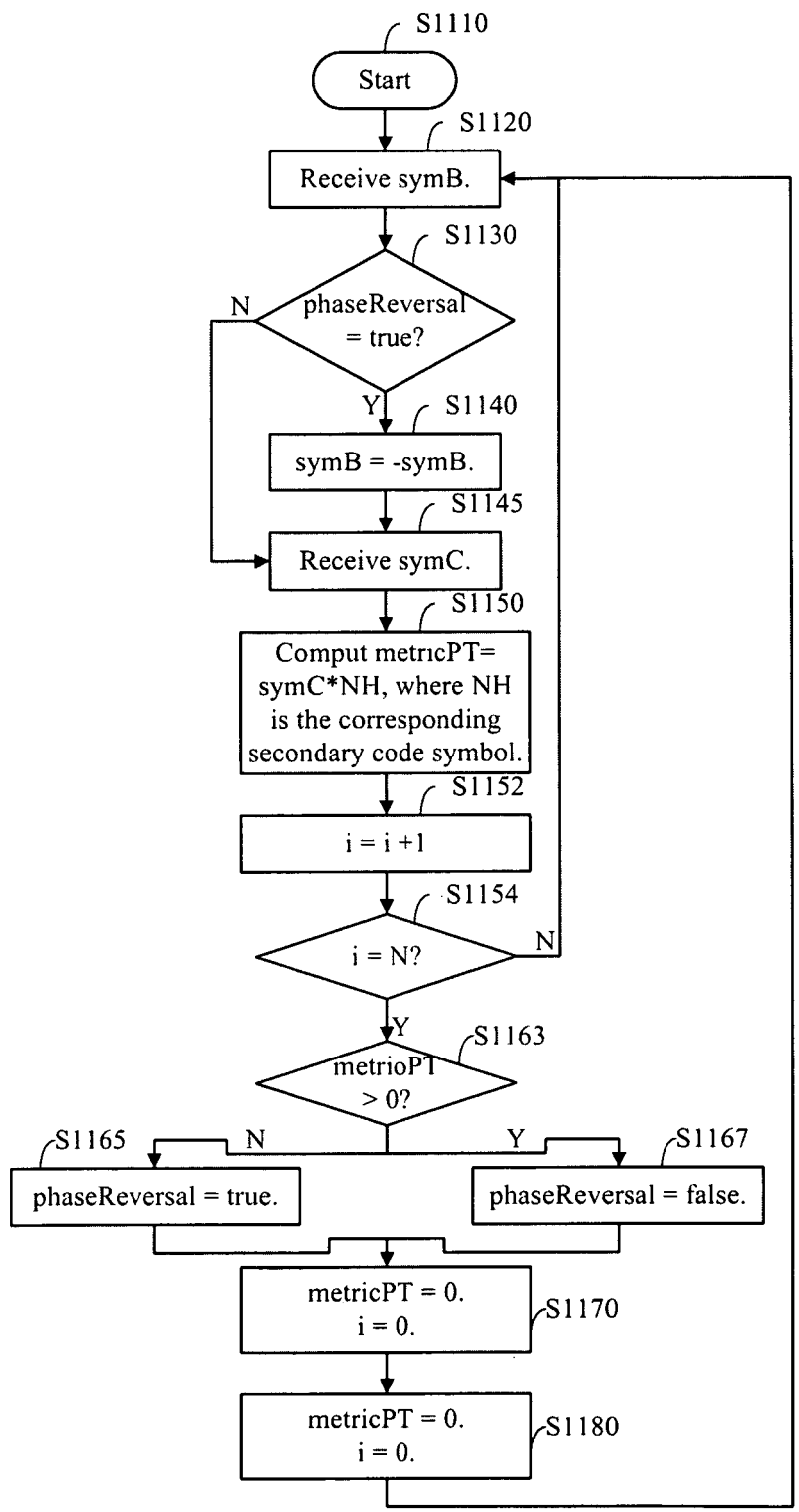
FIG. 12 is a flowchart showing a third embodiment of the data signal phase reversal correction method in accordance with the present invention.

FIG. 12 is a flowchart showing a further embodiment of the data signal phase reversal correction method in accordance with the present invention. The process starts at step S1110. In step S1120, the phase reversal detecting device 740 receives the data symbol stream symB. In step S1130, the phase reversal detecting device 740 checks the flag phaseReversal to see the flag is true or false. At this time, since the pilot symbol stream has not been checked yet, the flag phaseReversal is false. Under such a condition, the process goes to step S1145. In step S1145, the pilot symbol steam symC is received. In step S1150, metricPT is computed by calculating and accumulating a correction result of the $i^{th}$ symbol symC(i) of the pilot symbol stream and the corresponding symbol NH(i) of the known pilot sequence (e.g. the corresponding second code symbol), where i=0 to N-1. In step S1152, i is set to be i=i+1. In step S1154, it is checked if i has been reached N. If not, the process goes back to step S1120. If i=N, it means that the metricPT of the current N pilot symbols have been computed, then the process goes to step S1163 to decide if there is a phase reversal. In step S1163, the phase reversal detecting device 740 determines if the metricPT value is greater than zero. If the metricPT value is a negative value, it means that there is a phase reversal, and the flag phaseReversal is set as true (step S1165). If the metricPT value is a positive value, it means that there is no phase reversal, and the flag phaseReversal is set as false (step S1167). No matter the flag is set to be true or false, the process goes to step S1170. In step S1170, the values of metricPT and i are both reset to be zero. The process goes to step S1180, in this step, N is re-determined or adjusted based on reference information such as CNR estimation. For example, if CNR is low, N needs to be greater. Then the process goes back to step S1120 for checking the next N pilot symbols. As described, N is dynamically adjusted according to practical situations in the present embodiment.

In the above embodiments, the phase of the data symbol stream symB is corrected when it is found that the pilot data symbol stream symC has a phase reversal. However, in some cases, the phase of the data symbol stream symB is not corrected in the phase reversal detecting device 740. The phase reversal detecting device 740 only notifies the navigation processor 750 that there is a phase reversal, so that the navigation processor 750 can properly deal with the data and pilot symbol streams in subsequent processing.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A data signal phase reversal correction method for a GNSS receiver, the method comprising:
   receiving a pilot signal and a data signal from a satellite by the receiver, the pilot signal being transmitted from the satellite with a pilot symbol sequence known to the receiver;
   processing the pilot signal by the receiver including correlating a predetermined number of symbols in the received pilot signal with corresponding symbols in the known pilot symbol sequence;
   based on the correlation, determining by the receiver that a phase reversal has occurred in the received pilot signal; and
   in response to the determination that the phase reversal has occurred in the received pilot signal, correcting a corresponding phase reversal in the received data signal.

2. The method of claim 1, wherein the data signal and the pilot signal have an in-phase relationship.

3. The method of claim 1, wherein the data signal and the pilot signal have a quadrature relationship.

4. The method of claim 1, wherein correlating a predetermined number of symbols in the received pilot signal with corresponding symbols in the known pilot symbol sequence comprises computing a metric that defines whether a phase reversal has occurred in the received pilot signal, the metric comprising an accumulation of correlation values obtained by multiplying each symbol in the known pilot symbol sequence with a corresponding symbol in the received pilot signal.

5. The method of claim 4, wherein the metric is computed periodically.

6. The method of claim 1, further comprising adjusting the predetermined number of symbols according to a carrier-to-noise ratio (CNR) of the pilot signal.

7. The method of claim 4, wherein it is determined that there has been a phase reversal when the metric has a negative value.

8. The method of claim 1, further comprising:
processing a preamble of a frame of the data signal to determine that a phase reversal has occurred in the data signal; and
based on the processing of the preamble, correcting the phase reversal in the data signal.

9. The method of claim 8, wherein the processing of the pilot signal to determine whether a phase reversal has occurred in the pilot signal is performed simultaneously with the processing of the preamble of the frame of the data signal to determine whether a phase reversal has occurred in the data signal.

10. A data signal phase reversal correction system comprising:
a receiving module for receiving a pilot signal and a data signal from a satellite, the pilot signal being transmitted from the satellite with a pilot symbol sequence known to the receiving module;
a processing module for processing the pilot signal and the data signal, respectively;
a phase reversal detecting device for checking the pilot signal to determine if a phase reversal has occurred in the pilot signal, the checking including correlating a predetermined number of symbols in the received pilot signal with corresponding symbols in the known pilot symbol sequence; and
a correction module for correcting a corresponding phase reversal in the received data signal in response to a determination that a phase reversal has occurred in the received pilot signal.

11. The system of claim 10, wherein the correction module is incorporated into the phase reversal detecting device.

12. The system of claim 10, wherein the correction module is a Doppler remover implemented in the processing module for wiping off Doppler frequency components of the data and pilot signals.

13. The system of claim 10, wherein the correction module is a navigation processor implemented in the processing module.

14. The system of claim 10, wherein the data signal and the pilot signal have an in-phase relationship.

15. The system of claim 10, wherein the data signal and the pilot signal have a quadrature relationship.

16. The system of claim 10, wherein correlating a predetermined number of symbols in the received pilot signal with corresponding symbols in the known pilot symbol sequence comprises computing a metric that defines whether a phase reversal has occurred in the received pilot signal, the metric comprising an accumulation of correlation values obtained by multiplying each symbol in the known pilot symbol sequence with a corresponding symbol in the received pilot signal.

17. The system of claim 16, wherein the metric is computed periodically.

18. The system of claim 16, wherein the phase reversal detecting device further adjusts the predetermined number of symbols according to a carrier-to-noise ratio (CNR) of the pilot signal.

19. The system of claim 16, wherein the phase reversal detecting device determines that there has been a phase reversal when the metric has a negative value.

20. The system of claim 10, wherein the phase reversal detecting device also processes a preamble of a frame of the data signal to determine that a phase reversal has occurred in the data signal; and based on the processing of the preamble, corrects the phase reversal in the data signal.

21. The system of claim 20, wherein the processing module processes the pilot signal to determine whether a phase reversal has occurred in the pilot signal simultaneously with processing the preamble of the frame of the data signal to determine whether a phase reversal has occurred in the data signal.

* * * * *